UNITED STATES PATENT OFFICE.

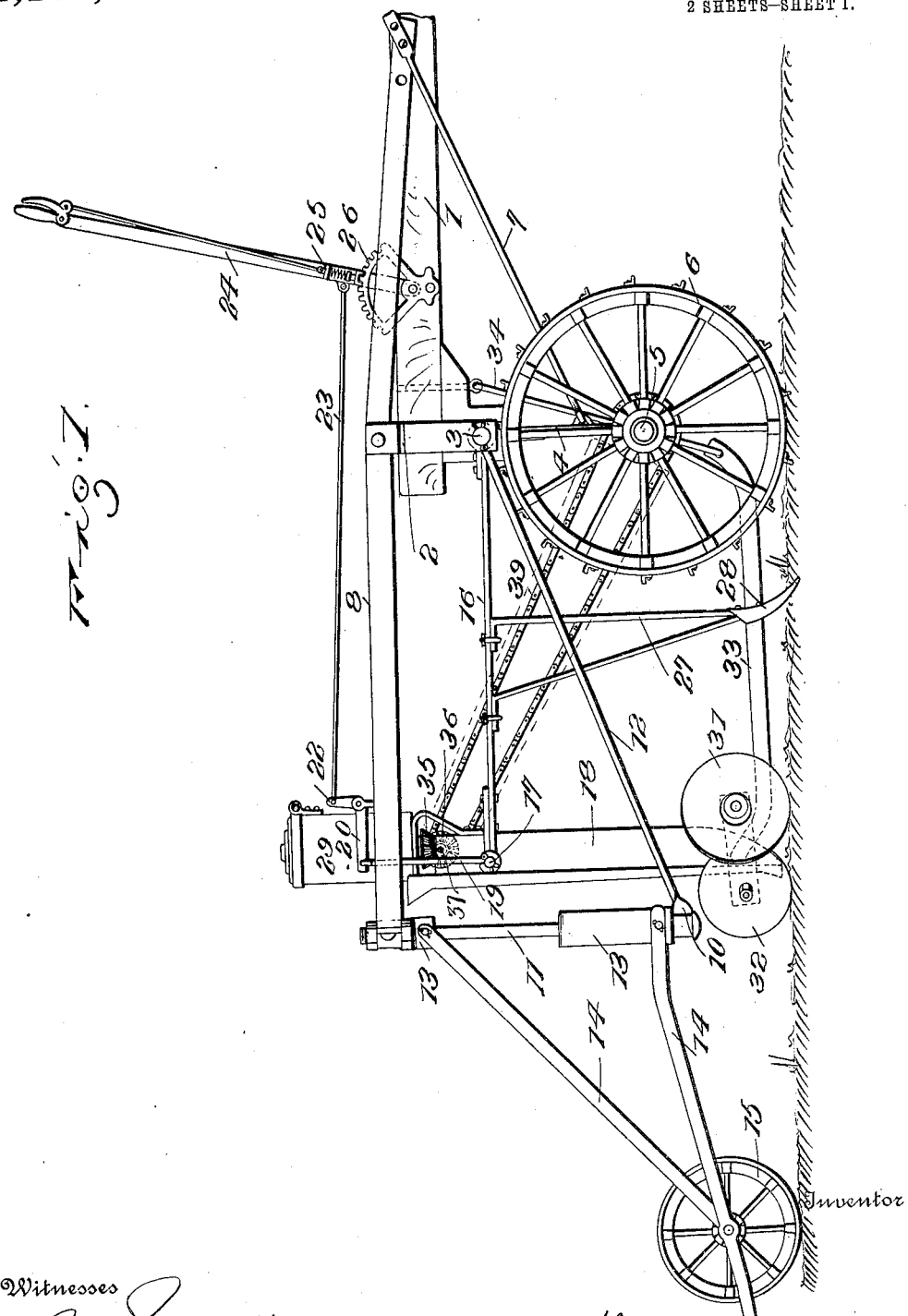

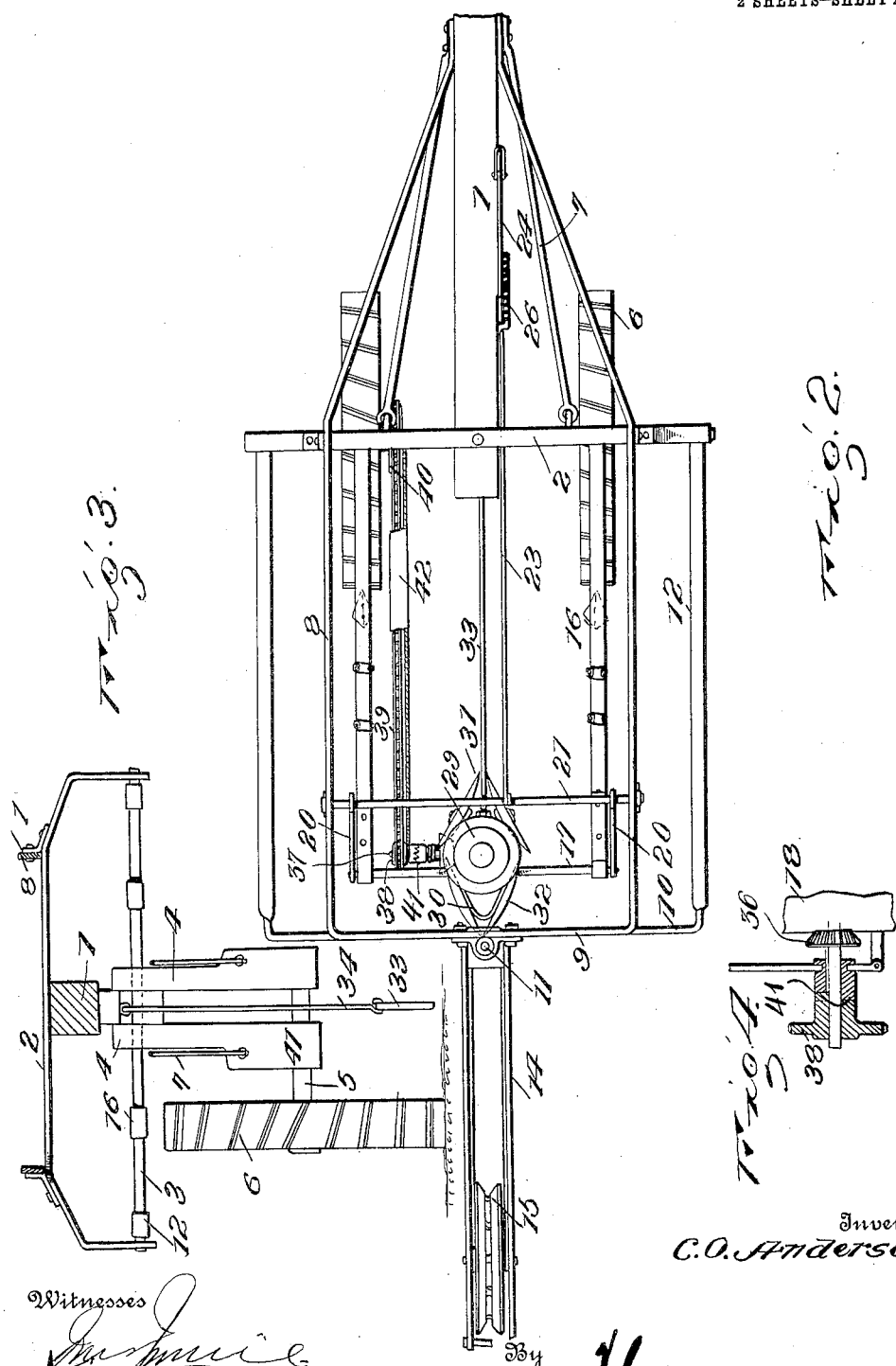

CHARLES O. ANDERSON, OF WATERVILLE, KANSAS.

PLANTER.

1,108,878. Specification of Letters Patent. Patented Sept. 1, 1914.

Application filed December 2, 1912. Serial No. 734,648.

*To all whom it may concern:*

Be it known that I, CHARLES O. ANDERSON, citizen of the United States, residing at Waterville, in the county of Marshall and State of Kansas, have invented certain new and useful Improvements in Planters, of which the following is a specification.

This invention relates to planters, and has for its object the provision of a planter which will form its own furrow, deposit seed therein, and then fill and cover the furrow.

The invention also seeks to provide means whereby the dirt at the sides of the furrow will be loosened and subsequent cultivating of the plants facilitated.

The invention also contemplates the provision of means whereby the furrow opener and coverer, together with the seed tube, may be raised and lowered simultaneously with the ground-loosening implements.

The invention is illustrated in the accompanying drawings and will be hereinafter first fully described and then more particularly pointed out in the claim following the description.

In the drawings: Figure 1 is a side elevation of my improved planter; Fig. 2 is a plan view of the same; Fig. 3 is a front end elevation of a portion of the planter; Fig. 4 is a detail view of a part of the gearing.

In carrying out my invention, I employ a tongue 1 which has its rear end secured to an upper cross bar 2 having its ends turned downwardly to be secured to a lower cross bar or rod 3 from which depend hangers 4 to support the axles 5 of the ground wheels 6, braces 7 being extended between the said hangers 4 and the tongue so as to hold them rigidly in their proper relative positions. An upper frame 8 is secured upon the upper cross bar 2 and has its front ends carried beyond the said cross bar and converging so as to be secured to the tongue, as clearly shown. The rear portion of this frame 8 constitutes a cross bar 9 in which and the cross bar 10 of a lower frame is swiveled a pin or vertical shaft 11. The cross bar 10 forms the rear end of a lower frame which has its side bars 12 carried upwardly and forwardly and secured upon the lower cross bar 3 at the ends of the same. Around the pin or vertical shaft 11, between the upper and lower cross bars 9 and 10, I fit the sleeves or collars 13 to which are attached the rearwardly extending arms or rods 14 which carry a packing wheel 15 at their rear ends. It will be readily noted that by the described arrangement this packing wheel 15 forms a caster so that it will oscillate freely from side to side and, consequently, follow the irregularities or sinuosities which may be developed in the furrow and, consequently, pack the earth immediately behind the seed tube.

Hung upon the lower cross bar 3 is the front end of an inner or supplemental frame 16 which is provided with a cross bar or rod 17 at its rear end, said cross bar or rod passing through the seed tube 18 and, consequently, forming a support for the same. Links 19 are pivoted at their lower ends upon this cross bar, and at their upper ends are pivotally attached to the rearwardly extending crank arms 20 rigid with a rock shaft 21 which is fulcrumed upon the frame 8. Near its center this rock shaft 21 is provided with an upstanding crank arm 22 from which a connecting rod 23 extends forwardly to a lever 24 which is fulcrumed upon the tongue 1, as shown clearly in Fig. 1. This lever is held in its adjusted position by the usual latch 25 and locking segment 26. Rigid with and depending from the side bars of the frame 16 are standards 27 which carry shovels or cultivator blades 28 at their lower ends whereby the soil at the opposite sides of the furrow will be loosened and may, therefore, be easily treated by the cultivator after the plants have appeared above the ground.

The seed tube 18 is equipped with a hopper or seed box 29 at its upper end which may be of any preferred form, and at its lower end brackets 30 are secured to the opposite sides of the seed tube. Upon the front ends of these brackets furrow-opening or forming disks 31 are journaled, and upon the rear ends of these brackets covering disks 32 are journaled. A drag bar 33 is also secured to the lower end of the seed tube and extends forwardly therefrom to a point between the ground wheels 6, the front end of said drag bar being connected by a link 34 with the main frame comprising the tongue 1 and the brackets connecting the same with the upper and lower cross bars 2 and 3. I thus provide means whereby the seed tube will be prevented from swinging rearwardly about the cross bar 17 under the influence of the resistance offered to the furrow-forming disks as the machine is drawn over the field. The seed tube will consequently be maintained in the proper position for forming the furrow and depositing the seeds therein.

The seed dropping shaft within the hopper or seed box 29 is equipped with a bevel gear 35 below the seed box which meshes with a pinion 36 on the end of a transverse shaft 37 which is carried by the upper end of the seed tube. A sprocket pinion 38 is mounted loosely on the outer end of the said shaft and a sprocket chain 39 is trained around the said shaft and a sprocket 40 on the axle of one of the ground wheels whereby the rotation of the ground wheel will impart motion to the sprocket 38. A clutch 41 is mounted upon the shaft 37 and is adapted to lock the said shaft to the sprocket pinion 38 so that the seed within the seed box will be actuated and fed into the seed tube and so pass to the ground.

The seed box being filled with seed to be planted, the machine is drawn over the ground in the usual manner and the furrow-opening disks 31 will take into the ground so as to form the furrow and the seeds will be deposited in the furrow so formed, as will be readily understood. The covering disks being arranged directly in rear of the seed tube, will throw the loose dirt into the furrow over the seed so that the same will be covered and the packing wheel following will compress the loose soil, so that the seed cannot be reached by birds or easily washed away by the rain.

A chain guard 42 is secured upon the frame to inclose the sprocket chain 39 and thereby prevent the same being coated with mud or dust, so that it will tend to clog and interfere with the smooth operation of the machine.

What I claim is:—

A planter comprising a cross bar having down-turned ends, a rod secured in and extending between said down-turned ends, hangers depending from said rod, ground wheels carried by said hangers, an upper frame secured to and extending rearwardly from said cross bar, a lower frame having side bars secured at their front ends to the said rod and extending downwardly and rearwardly therefrom, a caster carried by the rear ends of the upper and lower frames, an inner frame having its front end hung on said rod, means on the upper frame for raising and lowering the inner frame, ground treating implements carried by the sides of said inner frame, a seed tube carried by the rear end of said inner frame between the sides thereof, and means actuated by the ground wheels to feed seed through the tube.

In testimony whereof I affix my signature in presence of two witnesses.

CHARLES O. ANDERSON.

Witnesses:
SANDER LARSON,
A. C. LARSON.